INVENTOR
J. LAMONT
BY
ATTORNEY

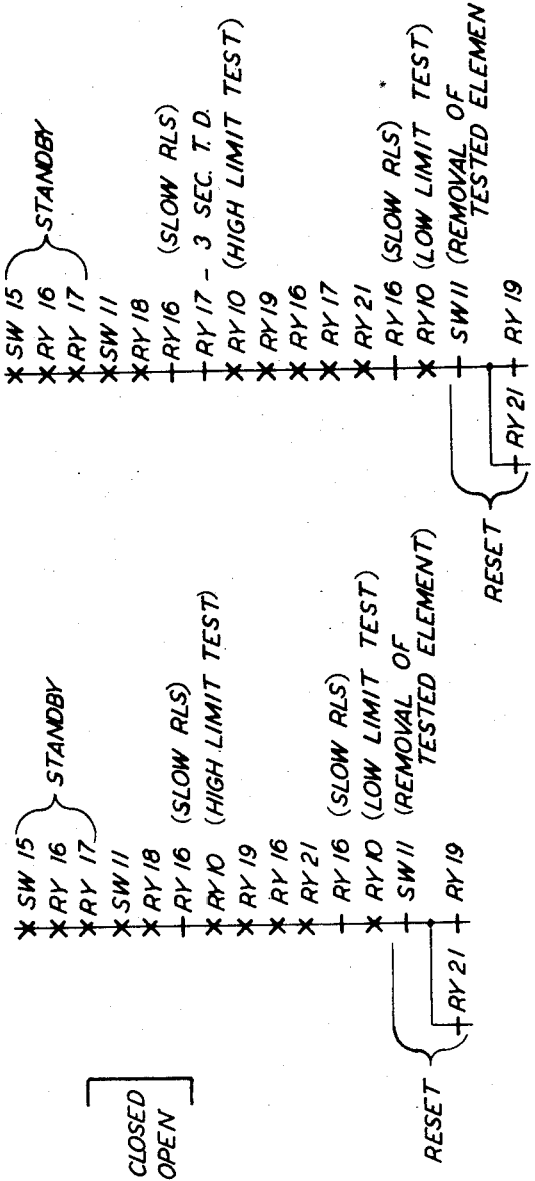

2,874,351
Patented Feb. 17, 1959

2,874,351

IMPEDANCE MEASURING SYSTEM

John Lamont, North Arlington, N. J., assignor to Western Electric Company, Incorporated, New York, N. Y., a corporation of New York Application September 14, 1956, Serial No. 609,977

5 Claims. (Cl. 324—57)

This invention relates to impedance measuring systems and particularly to a system for automatically determining whether elements such as coils, resistors, and capacitors are within acceptable high and low limit values.

In production testing such elements it is customary to compare the impedance of each element with predetermined high and low limit values successively to ascertain whether or not the impedance is below the high limit and above the low limit. While some automatic bridge type test sets have been designed for such limit testing, they are relatively complex since a bridge is inherently insensitive at or near the balance condition and, without special amplifiers and phase-sensitive devices, cannot utilize, for a control function, the detector information resulting from the tests of borderline or marginal elements.

It is the object of this invention to provide a simple, improved automatic bridge system for sequentially testing elements for high and low limits in which the problem of insensitivity of the bridge detector at or near balance condition are overcome.

In a system according to the invention, elements are connected in a bridge circuit in which they are successively compared with known high and low limits, the deviation in the impedance of an element under test from the limit values producing currents in a polarized balance detector for actuating an armature movable in two opposite directions in accordance with the direction of the current in the detector to control the continued sequential operation of the system. In the event that the unbalance current in the detector for one of the tests is not sufficient to actuate the armature, as could occur in the event that the impedance of an element under test was substantially equal to the limit value for which the bridge is set, stalling or a discontinuation of the sequential operation of the system is prevented by the automatic unbalancing of the bridge after sufficient time has elapsed to permit the normal operation of the detector.

In a preferred embodiment of the invention particularly suited for testing the resistance of coils, the comparison circuit is a direct current bridge and the detector is a polarized electromagnetic device, such as a relay. The direction of the current through the relay for each limit test and therefore the deflection of its armature is dependent on whether the resistance is above or below the limit to which the bridge is set. A coil connected into the bridge is first compared with one of the limits and, if the resistance of the coil does not exceed this value, the aramture of the relay will be deflected in a direction to control the switching of resistors in the bridge to establish the second test condition and to subject the coil to the second test, otherwise, the armature will be deflected in the opposite direction to stop the test sequence and actuate a "reject" indicator. In the second test, the element is compared with the other limit end, if the resistance of the coil does not exceed this value, the current in the relay will deflect the armature to complete the test sequence by actuating a test "OK" indicator. Coils having resistances outside this second limit will deflect the armature in the opposite direction to end the test sequence and actuate the "reject" indicator. The anti-stall operation is controlled by a time delay relay which operates at a predetermined time after each test is initiated to switch a resistance element across one of the branches to produce sufficient unbalance current through the relay to selectively deflect the armature whereby the test sequence may be continued to pass the coil. Since this anti-stall operation occurs for slightly off-balance conditions for the bridge, both above and below the balance point, the limit values for which the bridge is balanced are slightly less than the prescribed limits for the elements and the anti-stall circuit operates to unbalance the bridge in a direction to pass all marginal elements tested. In this way all elements having impedances within the prescribed limits will be passed by the system.

These and other features of the invention will be more fully understood from the following detailed description taken in conjunction with the accompanying drawing, in which:

Fig. 2 is a sequence diagram showing the normal sequence of operation of the switches and relays of Fig. 1; and Fig. 3 is a sequence diagram showing the sequence of operation of switches and relays for an element having an impedance substantially equal to the high limit value.

Figure 1:
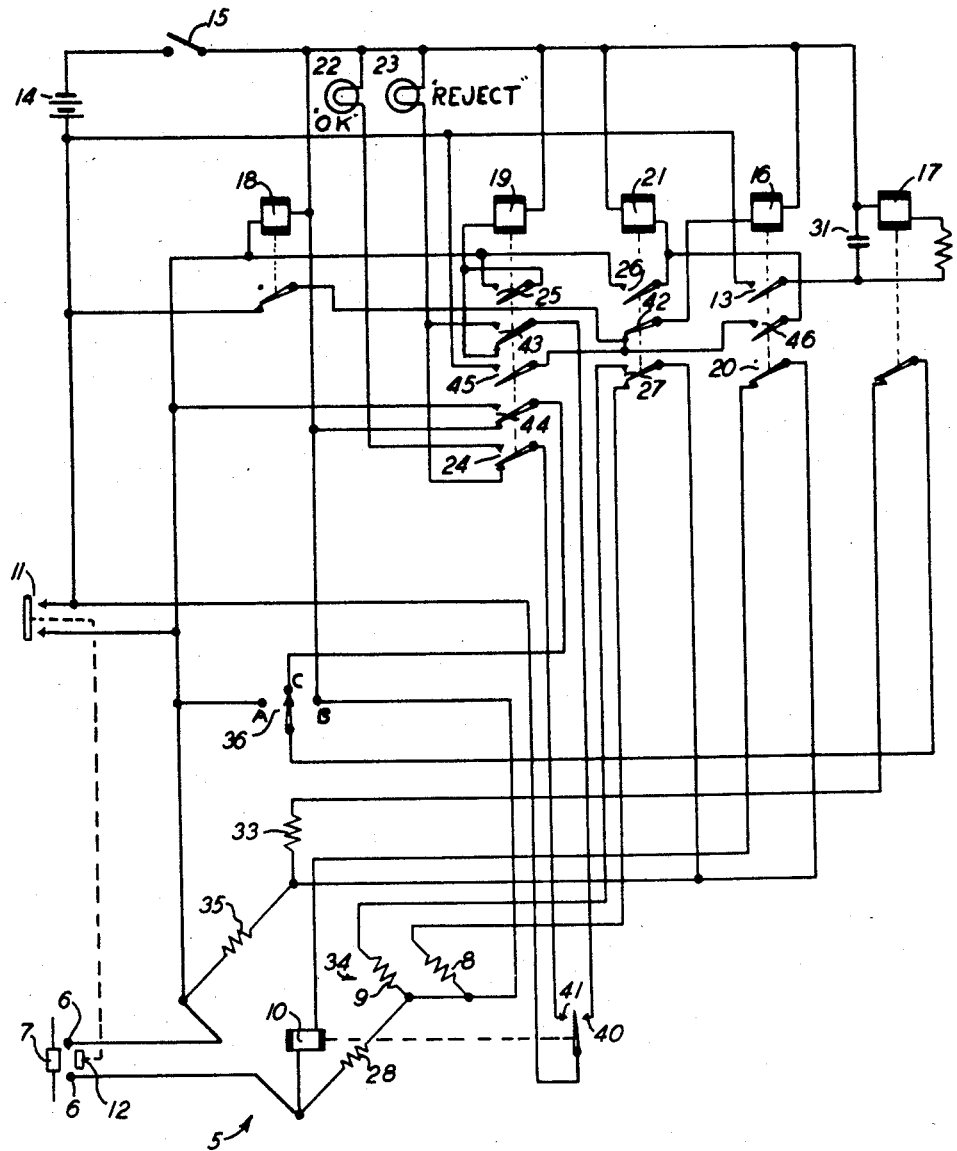
Fig. 1 is a schematic diagram of an embodiment of the invention particularly suited for testing the resistances of coils.

Referring now to the drawing, the schematic diagram of Fig. 1 shows a comparison type direct current bridge circuit 5 having terminals 6 in one branch to which impedance elements 7, such as coils, may be connected for comparing them with high and low limits. A resistor 8 is connected into ratio branch 34 of the bridge for the high limit test and has a resistance value which will result in a balance of the bridge when the resistance of an element 7 is equal to the high limit. For the low limit test, resistor 8 is removed from the branch 34 and a resistor 9 is connected in its place. The resistance of resistor 9 is such that the bridge is balanced when the resistance of the element 7 under test is equal to the low limit. The bridge has a polarized relay 10 in its detector circuit which, together with relays 16, 17, 18, 19 and 21, controls the automatic operating sequence of the test system in accordance with the results of the two tests. The bridge is energized through a fixture switch 11 which is operated when a resistance element 7 is connected to the test terminals, the actuator for switch 11 being shown schematically as the member 12 between the test terminals.

The operation of the system will be discussed in connection with a description of a test made on an element with reference to the sequence diagram of Fig. 2. This diagram is read from top to bottom and designates the operating sequence of the relays and switches. "X" designates the operation or the closing of a switch or relay and "–" designates the release or opening thereof. For testing the resistance of coils of a prescribed resistance of 1000 ohms, for which a 10 percent deviation is allowed, standard branch 28 and ratio branch 35 may be 1000 ohms each, high limit resistor 8 may be 912 ohms, and the low limit resistor 9, 1096 ohms. It is to be noted that these limits are slightly inside of the prescribed values which would be 909 and 1100 ohms, respectively. Of course, different ratios between branches could be used in accordance with well known bridge techniques.

In stand-by condition, that is, between tests, power switch 15 is closed to supply power from battery 14 to relay 16 which, in turn, operates relay 17, the operation of which will be described below in connection with the anti-stall feature of the system. When an element is connected to the test terminals 6 of the bridge, the fixture switch 11 is closed to supply power from the battery 14 to the bridge 5 and to relay 18, thereby initiating the automatic sequential operation of the system. The bridge is initially arranged for the high limit test, that is, with resistor 8 being connected in the limit branch 34 through the normally closed contacts 27 of relay 21. Relay 18, on operating, opens the circuit of relay 16, which is a conventional slow-release type relay. After a short delay to permit bridge currents to stabilize, which is especially necessary in testing coils where momentary initial current surges may improperly operate the bridge detector, contacts 20 of relay 16 close to connect polarized relay 10 across the bridge. Relay 10 is of the type which operates on direct current to move its armature in one direction or the other according to the direction of the current through its operating coil. If the element 7 under test has a resistance less than the high limit, the armature will close the contacts 40 to energize relay 19 through its normally closed contacts 43. Relay 19 thereupon locks-up in operated condition through its operated contacts 25. Through its operated contacts 45, relay 19 closes the energizing circuit for relay 16, which operates to disconnect the detector relay 10 preparatory to switching from the high limit bridge resistor 8 to the low limit resistor 9. Closed contacts 46 of operated relay 16 close the energizing circuit for relay 21, which locks-up in operated condition through its contacts 26. Relay 21 switches the bridge to the low limit condition through its operated contacts 27, and opens the circuit of relay 16 with the opening of its normally closed contacts 42. Relay 16, on being de-energized, again after a short delay, reconnects relay 10 in the bridge. If the resistance of the element under test is above the low limit, the contacts 41 of relay 10 close and complete the circuit of the test "OK" lamp 22 through the operated contacts 24 of locked-up relay 19, thereby ending the test. When the element is removed from the fixture, the automatic circuit is re-cycled by the opening of switch 11, which opens the lock-up circuits for releasing relays 19 and 21, thereby preparing the system for testing the next element.

If the element under test has a resistance above that of the high limit, the contacts 41 of relay 10 will close for the first test instead of the contacts 40, and thereby complete a circuit for the "reject" lamp 23 through the normally open contacts 24 of relay 19, which is not normally operated until after the high limit test. The automatic sequence is thereby interrupted or stopped. If the resistance under test is below the low limit, the contacts 40 of relay 10 will close instead of the contacts 41 for the second test and the energizing circuit for the "reject" lamp 23 is completed through the operated contacts 43 of relay 19.

In the event that the resistance of the element under test is so close to either the high or low limit that there is insufficient unbalanced current to operate detector relay 10, the sequence would normally stop, since the armature of relay 10 must be actuated to continue the operating sequence. To prevent this, the anti-stall circuit functions for example, as outlined in the sequence diagram of Fig. 3. Each time that relay 16 releases to connect the detecting relay 10 to the bridge, its contacts 13 open, disconnecting battery 14 from relay 17. Relay 17 is a time delay relay whose release is delayed, for example, three seconds, by the capacitor 31 in shunt therewith, to permit relay 10 to function normally as described above. If the resistance of an element is equal to or near the high limit value for which the bridge will be balanced during the high limit test, relay 10 will not operate in the interval allowed (i. e., with three seconds), and relay 17 will release and its normally closed contacts will connect a bridge unbalance resistor 33 in shunt with branch 34 of the bridge. The value of this resistor 33 is not critical and is selected to produce sufficient unbalance current in the bridge detector relay 10 to close its contacts 40 and thereby pass the element 7 under test. The bridge connections of resistor 33 are switched through contacts 44 of the relay 19 when the second test is being established so that the resistor 33 will be placed across the other ratio arm 35 of the bridge for the low limit test. In this way, low marginal cases are also passed, the armature of relay 10 being deflected to close its contacts 41 for this test so that the lamp 22 will be energized to inform the operator that the element 7 tests "OK." If desired, the circuit could be arranged to reject all marginal cases by having resistor 33 shunt the bridge branch 35 instead of 34 for the high limit test and branch 34 instead of 35 for the low limit test. This change could be made by reversing the bridge connections to the normally open and normally closed connections for contacts 44 of relay 19. In addition, a selector switch 36 makes it possible to by-pass the switching of the unbalancing resistor 33 alternately across branches 34 and 35 for the two tests so that the resistor 33 may be connected across only one of these branches 34 or 35 for both high and low limit tests. For example, with switch 36 set to position "B," the high marginal elements will be passed while the low marginal elements are rejected, or vice versa, when the switch is set to position "A."

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a system for sequentially testing the impedance of electrical elements for high and low limits, a bridge circuit having two ratio branches, a standard branch and a branch for receiving elements to be tested, means for successively changing the impedance ratio between the ratio branches so that the bridge is balanced when the impedance of an element under test is equal to a prescribed high limit in one instance, and to a prescribed low limit in another instance, a polarized balance detector for the bridge having an armature movable in two opposite directions, responsive to the direction of bridge unbalance current through the detector, to control the sequential testing of an article in the bridge in accordance with the results of the tests, the direction of the unbalance current for each setting of the bridge depending on whether or not the impedance of a tested element exceeds the impedance value for which the bridge is set, and anti-stall means comprising an impedance element, and switching means, responsive to a delay in the actuation of the armature of the detector when the element under test is connected in the bridge, for connecting the impedance element in the bridge for unbalancing the bridge to actuate the armature to continue the testing sequence.

2. In a system for sequentially testing the impedance of an element with high and low limits, a bridge circuit, means for successively setting the bridge for comparing an element with high and low limit conditions whereby the bridge is balanced when the impedance of an element under test is equal to the high or low limit for which the bridge is set, a polarized balance detector for the bridge responsive to bridge unbalance currents and having an armature movable in two opposite directions to control the sequential testing of an article in the bridge in accordance with the direction of unbalance currents through the detector for the two bridge conditions, and anti-stall means comprising an impedance element, and switching means, responsive to a delay in the actuation of the armature of the detector when the element under test is connected in the bridge, for connecting the impedance in the bridge for unbalancing the bridge to actuate the armature to complete the testing sequence.

3. In a system for sequentially testing the resistance of electrical elements for high and low limits, a direct current bridge having two ratio branches, a standard branch and a branch for receiving elements to be tested, the impedances of the branches being such that the bridge is balanced when the impedance of an element under test is equal to a first prescribed limit value, an alternate impedance element for one of the ratio branches having an impedance such that the bridge is balanced when the impedance of an element under test is equal to a second prescribed limit value, means for connecting the alternate impedance element in the branch, a polarized balance detector for the bridge having an armature movable in two opposite directions responsive to the direction of bridge unbalance current through the detector, switching means for connecting the detector in the bridge, means for actuating the switching means to connect the detector in the bridge after an element is connected therein, means responsive to the direction of current in the detector when the impedance of an element is within the first limit for operating the alternate element connecting means to connect the alternate element in the bridge, means for actuating the switching means to disconnect the detector from the bridge when the ratio branch is being changed, a first indicator operable by the deflection of the armature when the impedance of an element under test exceeds the limit value to which the bridge is set, a second indicator operable by the detector after the bridge is set for the second limit and the impedance of the element under test is within the second limit, a bridge unbalancing impedance element and switching means operative if the armature is not actuated within a predetermined time after the detector is connected in the bridge for connecting the unbalancing impedance in the bridge to produce an unbalance current in the detector.

4. In a device for testing impedance elements, a bridge having a high limit setting and a low limit setting, means for connecting articles to be tested in the bridge, a polarized balance detector responsive to bridge unbalance currents, switching means for connecting the detector in the bridge, means controlled by the detector for switching the bridge from one limit to the other, means for disconnecting the detector from the bridge when the bridge is being switched from one limit to the other, test result indicators controlled by the detector, and an anti-stall circuit for the bridge comprising an unbalancing impedance element and means for automatically connecting the unbalancing element in the bridge when the impedance of an element under test is so close to the limit value to which the bridge is set that the detector is not actuated.

5. In a device for testing impedance elements, a bridge having a high limit setting and a low limit setting, means for connecting articles to be tested in the bridge, a polarized balance detector responsive to bridge unbalance currents, switching means for connecting the detector in the bridge after an element has been connected therein, means controlled by the detector for switching the bridge from one limit to the other, means for disconnecting the detector from the bridge when the bridge is being switched from one limit to the other, test result indicators controlled by the detector, and an anti-stall circuit for the bridge comprising an unbalancing impedance element and means for selectively connecting the unbalancing element in the bridge to unbalance the detector in a predetermined direction when the impedance of an element under test is so close to the limit value to which the bridge is set that the detector is not actuated.

References Cited in the file of this patent

UNITED STATES PATENTS

| | | |
|---|---|---|
| 2,023,221 | Fischer et al. | Dec. 3, 1935 |
| 2,468,843 | Sunstein | May 3, 1949 |
| 2,507,566 | Frisbie et al. | May 16, 1950 |
| 2,707,356 | Bayha | May 3, 1955 |